No. 723,823. PATENTED MAR. 31, 1903.
J. W. BUEL.
THESAURUS DICTIONARY.
APPLICATION FILED OCT. 4, 1902.
NO MODEL. 2 SHEETS—SHEET 1.

*Fig. 1.* ac'-ro-bat. A performer of gymnastic feats. ACTING, ADEPT-BUNGLER, STRENGTH-WEAKNESS, WAG.
Ac-rop'-o-lis. The citadel of an ancient Greek city. DWELLER-HABITATION.
a-cross'. Over. ANTAGONISM-CONCURRENCE, CROSSING.
ac"-ro-te'-ri-um. An ornament of whatever nature forming the apex of a building. ARCHITECTURE.
a-cros'-tic. A composition. LETTER, WITTINESS-DULNESS.
act. To perform. ACTING, ACTION-PASSIVENESS, AGENCY, DELINEATION-CARICATURE, IMITATION-ORIGINALITY, PRECEPT; act a part, ACTING, MANAGER, SOCIETY-AFFECTATION, TRUTHFULNESS-FALSEHOOD; act as president, PRESIDENT-MEMBER; act one's part, DUTY-DERELICTION, OCCUPATION; act the tyrant, TYRANNY-ANARCHY; act upon, ACTION-PASSIVENESS, AGENCY, MOTIVE-CAPRICE; act up to, OBSERVANCE-NONOBSERVANCE; act well one's part, VIRTUE-VICE; act without authority, RULE-LICENSE; in the act, ACTION-PASSIVENESS, INNOCENCE-GUILT.
act'-drop". A curtain. ACTING.
ac'-ted upon. Passive. AGENCY.
act'-ing. Performing. ACTING, ACTION-PASSIVENESS, OCCUPATION, REPRESENTATIVE.

ACTING.

Acting. The performance of a dramatic part.
Dramaturgy. The art of composing and presenting a play.

ACTING—*Forms of Dramatic Representation.*

*Fig. 1a.*

After-piece, a farce after a play; ballet [F.], a * * * * * musical drama; opéra bouffe [F.], farcical comic opera; pantomime, dumb show; piece, a play; play, dramatic composition; proverbe [F.], a short comedy with a proverb for its title; Punch and Judy, puppet show; sensation drama, sensational play; spectacle [F.], a play; stage play, play for stage; acting; tragedy, drama representing terrible emotions; tragi-comedy, a drama where comic and tragic scenes are mingled; trilogy, a group of three dramas; vaudeville, variety show.

ACTING—*Nouns of Agent.*

Acrobat. One who practises gymnastic feats.
Acting manager. The officiating manager of a dramatic company.
Actor. One who takes a dramatic part.
*Amoroso* [It.]. A lover in a drama.
*Artiste* [F.]. A high-class actor.
Ballet-dancer. } One who dances in the ballet.
Ballet-girl.
*Buffo* [It.]. } A clown; a jester.
Buffoon.

Witnesses

James W. Buel, Inventor.
by
Attorneys

No. 723,823.  
PATENTED MAR. 31, 1903.

J. W. BUEL.

THESAURUS DICTIONARY.

APPLICATION FILED OCT. 4, 1902.

NO MODEL.  
2 SHEETS—SHEET 2.

Fig. 2.

act'-ing cor'-po-ral. A military officer. CHIEF-UNDERLING.
ac-tin'-ic. Pertaining to radiation of light or heat. LIGHT-DARKNESS.
ac'-tin-ism, Chemical effect of light. LIGHT-DARKNESS.
ac''-ti-nom'e-ter. Instrument for measuring radiation. OPTICAL INSTRUMENTS.
ac'-tion. Exertion of power. ACTION-PASSIVENESS, AGENCY, LITIGATION, STRIFE-PEACE; line of action, CONDUCT; put in action, USE-DISUSE; suit the action to the word, SIGN; thick of the action, ACTIVITY-INDOLENCE.

ACTION—PASSIVENESS.

Achievement. A successful action.
Act. That which is done or doing.
Action. Exertion of power or force in doing something.
Actor. One who acts, or takes part in any affair. See AGENT.
Agency. The faculty of exerting power. See AGENCY.
Blow. A sudden or forcible act or effort.
Bout. As much of an action as is performed at one time.
Business. That which one has to do or should do. See OCCUPATION.
*Coup d' état* [F.]. A violent measure of state in public affairs.
Measure. A specific act or course.
Move. An act in the carrying out of a plan.
Movement. A series of actions tending toward some end.
Operation. A mode of action.
Overt act. An open or manifest act.
Passage. The act of going from point to point.
Performance. Anything done or completed.
Perpetration. A doing; commonly used of doing something wrong.
*Praxis* [Gr.]. Exercise or discipline for a specific purpose.
Procedure. An act performed; the manner of moving forward. See WAY.
Proceeding. An act, or course of action.

Abstinence from action. Voluntary forbearance from labor.
Conservative policy. A settled method opposed to change.
*Dolce far niente* [It.]. Sweet idleness.
Fabian policy. A course of action avoiding a decisive contest.
Idle hours. Time not turned to appropriate use.
Inaction. Idleness; rest.
Inactivity. Want of energy. See ACTIVITY-INDOLENCE.
Inoccupation. Want of any work to engage the time and attention.
Neglect. Failure to do or use anything. See NEGLECT, CAREFULNESS-CARELESSNESS.

PASSIVENESS—*Verbal Expressions.*

Abstain from doing; beguile the time; be inactive; * * * unchanged; stop; take down; take time; take to pieces; talk against time; tide it over; undo; wait; waste time; while away the tedious hours; while away the time; whistle for want of thought.

PASSIVENESS—*Adjectives.*

*Désœuvré* [F.]. Unemployed; idle.
Fallow. Untilled; neglected.
Not doing, not done. See *Verbs.*

Fig. 3.

ac'-tion-a-ble. Affording cause for lawsuit. LAW-LAWLESSNESS.
*actions, les belles—cachées sont les plus estimables* [F.] (ac-si-on', le bel—ca-shā' son le plüz es-ti-mabl'). Beautiful acts hidden are the most worthy of praise. APPROVAL-DISAPPROVAL.

ACTIVITY—INDOLENCE.

Abandon. Careless and easy activity.
Activity. The state of being active, nimble or brisk.
Ado. Unnecessary activity.
Agility. Activity in the movement of the limbs.
Alacrity. A cheerful joyful activity, or promptitude.
Animation. Liveliness of the mind.
Ardour. Eagerness of passion, great activity.

act'-ive. Agile. ACTIVITY-INDOLENCE, SWIFTNESS-SLOWNESS, VIGOR-INERTIA; active service, FIGHTING-CONCILIATION; active thought, HEED-DISREGARD; active voice, VERB.
ac'-ive-ly. Briskly. ACTIVITY-INDOLENCE.
ac-tiv'-i-ty. Exertion of energy. ACTIVITY-INDOLENCE, VIGOR-INERTIA.

ACTIVITY—INDOLENCE.

Dawdling. Aimless, trifling action. See *Verbs.*
Drowsiness. Disposition to sleep or inactivity. See *Adjectives.*
Dulness. Slowness of understanding; stupidity. See *Adjectives.*
Heaviness. The quality of being heavy or depressed.
Idleness. The state of being inactive.
Inaction. Cessation from action. See ACTION-PASSIVENESS.
Inactivity. Want of action.

Fig. 4.

Witnesses  
*E. A. Stewart*  
*Jno E Parker*

*James W. Buel,* Inventor.  
by *C. A. Snow & Co.*  
Attorneys

THE NORRIS PETERS CO., PHOTO-LITHO., WASHINGTON, D. C.

UNITED STATES PATENT OFFICE.

JAMES WILLIAM BUEL, OF PHILADELPHIA, PENNSYLVANIA.

THESAURUS DICTIONARY.

SPECIFICATION forming part of Letters Patent No. 723,823, dated March 31, 1903.

Application filed October 4, 1902. Serial No. 125,988. (No model.)

*To all whom it may concern:*

Be it known that I, JAMES WILLIAM BUEL, a citizen of the United States, residing at Philadelphia, in the county of Philadelphia and State of Pennsylvania, have invented a new and useful Thesaurus Dictionary, of which the following is a specification.

The purpose and object of the present invention is to provide a thesaurus dictionary of the English language, the work being so arranged as to facilitate and provide a ready means for finding and determining the exact word or term needed to definitely, clearly, and forcibly express any given idea relating to any subject, simple or complex. To this end there is printed, first, a vocabulary, in alphabetical arrangement, of all English words, with their pronunciations and concise definitions, following which there is printed in proper and immediate connection with each important vocabulary-word a number of reference-words, also arranged in alphabetical order, said reference-words constituting captions, which appear in alphabetical position in the vocabulary, and under the captions are alphabetically arranged categories of words and terms that have any relationship in meaning to the caption and corresponding vocabulary-word. In some cases the reference-words and captions are made to include positive and negative terms, and these are always so arranged that that class of words which naturally appeal to the mind as superior, as distinguished from antithetical inferior words, determines the position of the caption in the vocabulary. For instance, such words as "good," "gain," "certainty" constitute portions of captions in which the inferior terms follow, these captions reading "Good—evil," "Gain—loss," "Certainty—doubt," and the superior term always determines the position of the caption in the category. The category-words which follow the captions are cross-referenced with the vocabulary-words and are arranged in alphabetical order, each followed by a definition and wherever possible divided into parallel columns of synonyms and antonyms and further grouped according to their grammatical relationships and parts of speech. In addition to the vocabulary-words of the language in which the book is printed the vocabulary further comprises terms and phrases in foreign languages, each followed by phonetic pronunciations and translations.

In the accompanying drawings, Figures 1, 1ª, 2, 3, and 4 are reproductions of a number of portions of pages of a dictionary arranged in accordance with the present invention.

The arrangement of English words and phrases, classified and arranged so as to facilitate the expression of ideas and assist in literary composition, is embodied in the well-known Roget's *Thesaurus;* but in this work the words and phrases are not arranged in alphabetical order, as they are in a dictionary, but according to the ideas which they express, and further than this there are no definitions of the words or explanations of the phrases. The book is really an index of words to be looked up in dictionaries and cyclopedias, unless one comes to it with his mind thoroughly stored with words and meanings. Besides the single words there are collective phrases, kennings, and longer familiar quotations in English and foreign languages. Roget's arrangement is primarily one of namable objects. "It is impossible we should thoroughly understand the nature of the signs unless we first properly consider and arrange the things signified," is his motto, taken from Horne Tooke's *Diversions of Purley.* He classifies namables after the manner of the English psychologists into matter, mind, (intellect, volition, affections,) space, and abstract relations, and divides and subdivides these until he makes out an even thousand divisions, and into these he puts all the words. In order to find any word, it is necessary to think out in which subdivision its idea belongs.

Early vocabularies often consist of groups arranged by their ideas. That of Aelfric, a tenth-century Anglo-Saxon work, begins with farmers' tools; then come ecclesiastical matters, then political, then diseases, then wild beasts, insects, vessels, a room and its contents, and so on. Nothing could be done with the materials of the *Oxford Dictionary* or the *Century* or *Standard* on any such plan. Dictionaries are sometimes arranged according to a philological system. Ettmuller's

*Anglo-Saxon Dictionary* has the words classified under their roots and the roots and words arranged according to the scientific order of the sounds. The beginner has to master this order of sounds and then to guess under what root his word belongs, or rather under what root Ettmuller thinks it belongs. He has, in fact, to learn the language to its depths before he can use the dictionary.

The machinery of a serviceable dictionary is found in the alphabet. The invention of alphabetical writing has often been pronounced the most important ever made. It is not the least of its benefits to mankind that it affords the means of making knowledge accessible. Every one knows the letters of the alphabet. If all thoughts are arranged under their words and the words arranged in alphabetical order, any one can find offhand any of the million facts and thoughts which are stored in the dictionary. The use of the simple alphabetical order is almost as important an invention as the representation of words by single signs of their elementary sounds.

The thesaurus forming the subject of the present invention not only presents all the prime features of a dictionary—spelling, phonetic pronunciation, and concise working definitions—but it presents a practical plan of grouping words of related meaning, and the definition of each word is given in all cases, so that the shades of difference in significance are always clearly indicated and the use of words definitely shown grammatically and properly. It presents all words with their synonyms and opposites and defines each one to show the shades of difference in meaning and how to use every term grammatically and always with fitness. It presents categories of words in parallel columns—all positive terms on the left hand and all negative terms on the right hand—to facilitate reference. The work also presents vocabulary-words in alphabetical order with their correct pronunciations and definitions. The list also presents all the foreign terms and phrases, Latin, Greek, German, French, Spanish, and Italian, followed by phonetic pronunciations and translations that a person is likely to meet with in literature. It also divides all words into their proper grammatical relationships, giving such analyses as will enable one to use the words with appositeness and to frame sentences with accuracy. The vocabulary-words properly accentuated are printed in brevier, the definitions in lower-case Roman. The pronunciations are in phonetic letters. Foreign phrases are in italics. Idioms and common phrases are in brevier. Captions are in capitals. Associated words are in heavy-face nonpareil; references in small caps. By this plan of distinguishing the reference features of the work persons consulting its pages are directed in the most certain and satisfactory way to the object of their quest. It will be observed that the vocabulary-words are printed in brevier heavy-face type, followed by definitions in lower-case Roman. Following these are cross-reference captions printed in small-capital letters and also arranged in alphabetical order. The captions may be found in the alphabetically-arranged vocabulary and under each are printed categories, also in alphabetical order, of all words, terms, and phrases that have any relationship in significance to the vocabulary-word from which references is made.

This work, it will be observed, has a triple alphabetical arrangement, including, first, the vocabulary-words; second, the alphabetically-arranged reference-words, which direct the inquirer to caption-words in proper alphabetical position in the vocabulary, and, third, a category under the captions, also in alphabetical order, of all words, terms, and phrases related to the vocabulary-word. Each of the words or phrases in the category is followed by a concise definition and may also be found in proper alphabetical position in the vocabulary. As an instance of the triple alphabetical arrangement reference is had to Figs. 1 and 1ª, wherein the word "act" appears as a vocabulary-word. Following this is a definition and then the cross-reference terms in small caps: "Acting, Action, Passiveness, Agency, Delineation—Caricature, Imitation—Originality," which may be found in their alphabetical places as captions. Fig. 1 illustrates the position of the word "acting" as a caption, and immediately under the caption appear all the words in our language that belong to "acting" as an institution, the category being divided into groups of associated words, nouns, verbs, and adjectives, according to their proper grammatical relationships and each being followed by a concise definition. Each word in the category is arranged in proper alphabetical position and may further be found in its proper place in the vocabulary-words. Thus "acrobat" in the category of Fig. 1ª is found also as a vocabulary-word in Fig. 1 and followed by a definition and thence by the reference-word "acting," by which the inquirer is directed to the latter word for the word groups of corresponding significance.

In Figs. 2, 3, and 4 I have illustrated the plan of using positive and negative words in parallel columns and how the terms in the category are grouped according to their grammatical relationships and parts of speech. The first column contains all words and phrases naturally associated according to the laws of similarity, contiguity, and comprehension—synonyms and the like. The second column contains a similar group, related to the first column according to the law of contrast—antonyms, polar opposites, and the like.

In the alphabetically-arranged category will also be found a number of foreign words and phrases from the French, Spanish, Latin, and Italian languages, each followed by a concise definition, and each of these words and phrases may further be found in alphabetical position in the vocabulary, together with their correct pronunciations and definitions, thus taking "*coup d'etat*," a French phrase, from Fig. 2, the term will be found in alphabetical position in the vocabulary followed by the phonetic pronunciation "*cu dé-ta*" and followed by its English definition and reference-words, among which are "Action—passiveness." These last-named instances are not illustrated in the drawings; but it will be understood that in each case the words or phrases of reference-words, captions, and category-words constitute cross-references to vocabulary-words throughout the work. This triple alphabetical arrangement avoids the necessity of an index and enables one to find a desired word or term almost immediately. All efforts to construct a work of this kind have failed heretofore on account of requiring an index more voluminous and complicated than the work itself to enable one to find the "missing word." The arrangement of word-grouping in alphabetical order is such that the inquirer may readily find the proper word for expressing any idea. For example, should the inquirer desire to use the word "mnemonics" to express the art or science of artificial memory, but cannot think of that word, the cross-reference plan on which this thesaurus is arranged is such as to enable the inquirer to find the word or term needed by thinking of some simple word of related significance, such as "memory" or "remembrance." Now by looking in the alphabetically-arranged vocabulary, as in any dictionary, the inquirer finds the simple word thus thought of—"memory"—and following this in alphabetical order a number of cross-reference caption-words printed in small-capital letters. Among these the most nearly related terms are "Remembrance—forgetfulness," and turning to these captions in proper alphabetical position in the vocabulary he will find a complete category of every word in the English language that has any relationship in significance to "memory," "recollection," "relic," and of course in the list the word "mnemonics" appears, while in a parallel column in juxtaposition he will discover at the same time all the antonyms, antithetical terms, such as "forgetfulness," "oblivion," "lose," &c.

Having thus described my invention, what I claim is—

1. A thesaurus dictionary having vocabulary-words arranged in alphabetical order and followed by concise definitions; reference-words following important vocabulary-words and also arranged in alphabetical order; captions corresponding to the reference-words and arranged in alphabetical position in the vocabulary, and categories of related words and terms arranged under the captions.

2. A thesaurus dictionary having vocabulary-words, including foreign words and phrases, arranged in alphabetical order and followed by concise definitions, the foreign words and phrases being followed by phonetic pronunciations and translations; reference-words in alphabetical order following each important vocabulary-word; captions corresponding to the reference-words and arranged in alphabetical position in the vocabulary, and categories arranged under said captions, and including related words, terms and phrases.

3. A thesaurus dictionary having vocabulary-words arranged in alphabetical order and followed by concise definitions; reference-words following important vocabulary-words and also arranged in alphabetical order, said reference-words appearing as captions in alphabetical position in the vocabulary, and categories of related words arranged under the captions in alphabetical order and each followed by a definition.

4. A thesaurus dictionary having vocabulary-words arranged in alphabetical order and followed by concise definitions; reference-words following important vocabulary-words and also arranged in alphabetical order, said reference-words appearing as captions in alphabetical position in the vocabulary, and categories of related words arranged under the captions in alphabetical order and printed in separate groups, the synonyms in one group and the antonyms in another group.

5. A thesaurus dictionary in which the vocabulary-words are arranged in alphabetical order and followed respectively by definitions and, in the case of important words, by cross-reference captions with both positive and negative terms, and by parallel columns of synonyms and antonyms also arranged respectively in alphabetical order and followed by definitions, said synonyms and antonyms being grouped according to their grammatical relationships and parts of speech.

6. A thesaurus dictionary in which the vocabulary-words are arranged in alphabetical order, followed respectively by concise definitions, and, in the case of important words, by captions including both positive and negative terms and constituting a cross-reference to the vocabulary-words, there being parallel columns of synonyms and antonyms, each column including related words and terms in different languages followed respectively by concise definitions, the synonyms and antonyms being arranged in groups according to their grammatical relationships and parts of speech.

7. In a thesaurus dictionary, a system of cross-reference comprising, in connection with each of a number of alphabetically-arranged vocabulary-words, a plurality of alphabetically-arranged correlated reference-words each referring to captions appearing in alphabetical position in the vocabulary, and alphabetically-arranged categories under each caption, said categories being cross-referenced with the vocabulary-words.

8. A thesaurus dictionary having vocabulary-words arranged in alphabetical order and followed by concise definitions, and alphabetically-arranged captions comprising both superior and inferior terms of which the former determines the position in the vocabulary.

In testimony that I claim the foregoing as my own I have hereto affixed my signature in the presence of two witnesses.

JAMES WILLIAM BUEL.

Witnesses:
  WALKER H. HAYS,
  JOHN B. DEVINE.